(No Model.)

M. HOWE.
CAR COUPLING.

No. 302,405. Patented July 22, 1884.

Witnesses
B. J. Noyes.
Henry Marsh.

Inventor
Manley Howe
by Crosby & Gregory
Attys.

UNITED STATES PATENT OFFICE.

MANLEY HOWE, OF BOSTON, MASSACHUSETTS.

CAR-COUPLING.

SPECIFICATION forming part of Letters Patent No. 302,405, dated July 22, 1884.

Application filed April 7, 1884. (No model.)

*To all whom it may concern:*

Be it known that I, MANLEY HOWE, of Boston, county of Suffolk, State of Massachusetts, have invented an Improvement in Car-Couplings, of which the following description, in connection with the accompanying drawings, is a specification, like letters on the drawings representing like parts.

In this my invention a series of disks or plates provided with recesses and with projecting hubs, and having shanks, are placed loosely one above another in retaining-recesses in the heads of the draw-bars, as will be described, and means have been provided by which to simultaneously lift the disks held in one or both draw-bars when it is desired to uncouple the cars.

My improved coupling is automatic in its engagement, and it is immaterial as to whether the track is straight or curved, or if one platform is higher or lower than the other.

Figure 1:
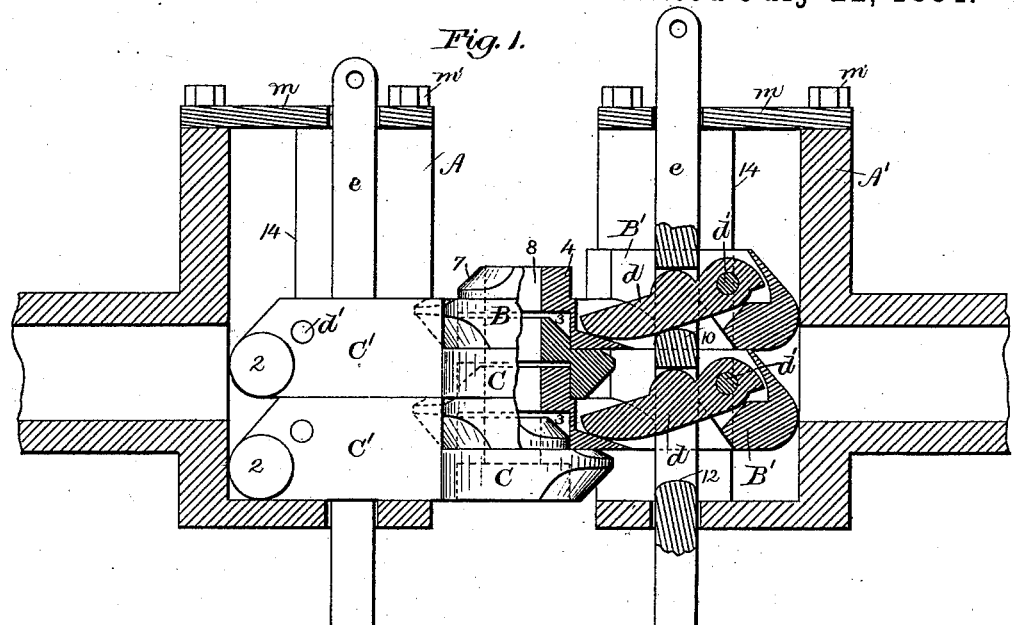
Figure 2:
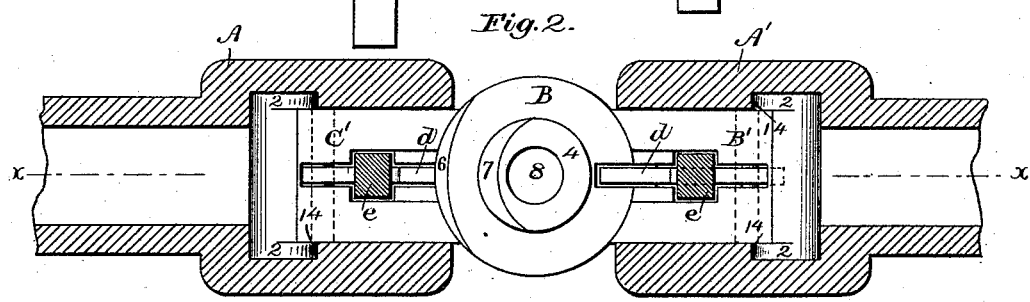
Figure 3:
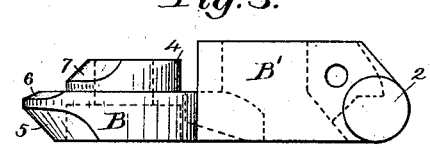
Figure 4:
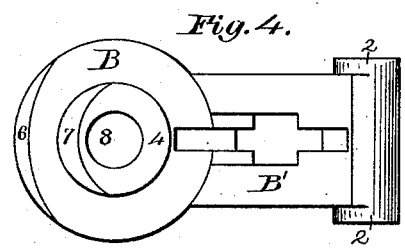

Figure 1 represents in vertical section a car-coupling embodying my invention, the section being in the line $x\ x$, Fig. 2. Fig. 2 is a top view and partial horizontal section of my improved coupling; Fig. 3, a side view of one of the disks employed, and Fig. 4 a top view of Fig. 3.

The draw-bars A A', to be attached in any usual manner to the cars to be coupled, are provided with T-shaped or other suitable irregular-shaped recesses, forming shoulders 14, (see Fig. 2,) for the reception of the shanks B' C' of the coupling disks or plates B C, respectively, the said shanks being provided with irregular-shaped shanks to enter the recesses of the draw-bar heads and be retained therein against movement in the direction of the length of the said shanks, which is the direction of strain when the coupling is coupled to connect cars. In the drawings each shank has shoulders 2 2, to enter corresponding recesses in the head A or A'. The disks or plates B C are alike. Each one has at its under side a recess or socket, 3, and at its upper side a projection, 4, the recess 3 at the under side of each disk or plate receiving the projection 4 at the upper side of the disk or plate next below it, as shown in Fig. 1, the said disks or plates being thus interlocked one series with the other, and remaining so by means of the weight of the plates, there being in practice, preferably, two such disks or plates in each draw-head. The disks or plates have a central hole, 8, for the reception of a coupling-pin, if it should be desired to use one of my couplings with an ordinary link-and-pin coupling. The disks or plates are each provided with beveled surfaces 5 6 7, to enable the disks of one series to meet those of the other series, and pass one between two others and become locked together, the shape of the disks being such that they will co-operate and couple themselves when brought together, no matter what may be the angular position of the cars with relation to each other. The working-faces of the projections 4 and recesses 3, being substantially circular, permit the coupling to turn readily, to accommodate the cars to tracks of any practical curvature without possibility of breaking or disengaging the coupling.

To detach cars once coupled together by means of my improved coupling, each shank is slotted and provided with a lever, $d$, pivoted at $d'$, and which is extended forward nearly to the rear side of the projection 4, so that the free ends of the levers are lifted one after the other in succession from top to bottom by projections 10 12 of the lifter-rod $e$, which may be operated by hand applied directly to it, or by a cord, lever, or other suitable and usual device commonly employed to lift coupling-pins for car-couplings. The free ends of the levers of one set of disks strike the free ends of the disks or plates of the opposed series and lift them, as will be readily understood from the drawings.

I do not broadly claim pieces of metal to hook one over the other.

The shanks B' C' are dropped down into the recesses in the draw-heads from their upper sides and are held therein by the caps $m$, secured in place by the bolts $m'\ m'$.

As an obvious equivalent of the slotted draw-heads, the shanks might be slotted to embrace and slide up and down vertically on a T-shaped or other irregular-shaped projection of the draw-head.

In practice the uppermost disk of each head has that part of it which is beveled at 26 a little shorter than the corresponding parts of the disks below them, in order that the lower disks may act as guides.

I claim—

1. In a car-coupling, a draw-head having a shouldered or irregular recess, combined with the disks or plates having shanks provided with projections to engage the shoulders of the draw-head, substantially as described.

2. In a car-coupling, two series of disks or plates, B C, provided each with a recess, 3, and a projection, 4, and having shanks B' C', respectively, combined with draw-heads to receive and hold the said shanks, substantially as described.

3. In a car-coupling, two series of disks or plates, B C, provided each with a recess, 3, and projection 4, and beveled at their front ends, and provided with shanks, combined with draw-heads to receive and hold the said shanks, substantially as described.

4. In a car-coupling, two series of disks or plates provided with shanks and with recesses 3 and projections 4, and beveled at their front ends, and draw-heads to receive the said shanks, combined with levers and a lifting-bar to operate the said levers successively and lift the disks or plates one after the other, commencing with the one which is uppermost, substantially as described.

In testimony whereof I have signed my name to this specification in the presence of two subscribing witnesses.

MANLEY HOWE.

Witnesses:
G. W. GREGORY,
B. J. NOYES.